United States Patent
Birmiwal et al.

(10) Patent No.: US 7,934,042 B2
(45) Date of Patent: Apr. 26, 2011

(54) VOLTAGE INDICATOR SIGNAL GENERATION SYSTEM AND METHOD

(75) Inventors: Parag Birmiwal, Austin, TX (US); Bernard Charles Drerup, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1519 days.

(21) Appl. No.: 10/965,628

(22) Filed: Oct. 14, 2004

(65) Prior Publication Data
US 2006/0085586 A1 Apr. 20, 2006

(51) Int. Cl.
*G06F 13/36* (2006.01)
*H05K 7/10* (2006.01)

(52) U.S. Cl. ........ 710/306; 710/301; 710/302; 710/305; 713/300; 713/320

(58) Field of Classification Search .......... None
See application file for complete search history.

(56) References Cited

U.S. PATENT DOCUMENTS

| | | | |
|---|---|---|---|
| 4,891,788 A * | 1/1990 | Kreifels | 365/49 |
| 5,911,050 A * | 6/1999 | Egan et al. | 710/100 |
| 5,936,444 A * | 8/1999 | Pathak et al. | 327/143 |
| 5,966,078 A * | 10/1999 | Tanguay | 340/636.1 |
| 6,141,583 A * | 10/2000 | Pape et al. | 607/2 |
| 6,515,519 B1 * | 2/2003 | Miyazaki et al. | 327/105 |
| 6,760,574 B1 * | 7/2004 | Lu et al. | 455/226.1 |
| 6,941,483 B2 * | 9/2005 | Brown et al. | 713/500 |
| 7,073,078 B2 * | 7/2006 | Srinivasan et al. | 713/300 |
| 7,076,591 B2 * | 7/2006 | Arramreddy | 710/302 |
| 2004/0003155 A1* | 1/2004 | Krontz | 710/300 |
| 2005/0223246 A1* | 10/2005 | Bacchus et al. | 713/300 |

OTHER PUBLICATIONS

PCI-X Protocol Addendum to the PCI Local Bus Specification Revision 2.0a—Jul. 22, 2003—pp. 100, 271, 273-274.*
PCI-X Electrical and Mechanical Addendum to the PCI Local Bus Specification Revision 2.0a—Aug. 22, 2003—p. 21.*

* cited by examiner

*Primary Examiner* — Brian T Misiura
(74) *Attorney, Agent, or Firm* — Matthew B. Talpis; James L. Baudino

(57) ABSTRACT

The present invention provides for a system comprising a peripheral component interface (PCI) host bridge. The PCI host bridge is configured to be coupled to a PCI bus, and to receive a system reset signal, to generate a PCI bus reset signal based on the received system reset signal, to detect a PCI operational mode of the PCI bus, and to generate a voltage indicator signal based on the detected PCI operational mode. A voltage regulator is coupled to the PCI host bridge and configured to receive the voltage indicator signal and to regulate a signaling voltage for the PCI bus based on the voltage indicator signal.

10 Claims, 4 Drawing Sheets

VOLTAGE INDICATOR SIGNAL GENERATION SYSTEM AND METHOD

TECHNICAL FIELD

The present invention relates generally to the field of computer devices and, more particularly, to a system and method for voltage indicator signal generation.

BACKGROUND

Modern computer architecture often employs a peripheral component interconnect (PCI) bus to connect peripheral components to a central or host system. As PCI technology evolved, various standards were developed in order to provide compatibility and continuity of PCI devices and architecture across a broad range of manufacturers and innovative devices. One recently developed standard is PCI-X 2.0.

One aspect of PCI-X 2.0 is that it is backwards compatible, that is, PCI-X 1.0 compliant systems can operate or be configured to operate on a PCI-X 2.0 compliant system. Another aspect of the PCI-X 2.0 standard is support for both 1.5 V and 3.3 V category-1 signaling. Generally, category-1 signals are a subset of PCI-X bus signals, as defined by the standard. Thus, a PCI-X 2.0 compliant host system detects the capabilities of all the plugged add-in cards in the system. In typical systems, this is achieved by sampling the PCIXCAP pin, a dedicated pin configured to identify the PCI-X mode of operation for a particular plugged add-in card. In particular, a PCI-X 2.0 compliant host system samples the PCIXCAP pin, determines the mode of operation, and provides the appropriate voltage level for the category-1 signals and other signals, according to the mode of operation.

In typical PCI systems, the mode of operation is often determined at a system reset or power-on reset (POR) time. That is, the PCI-X mode of operation is determined when the system is reset or first powered up. Typical system reset or POR operations often involve additional steps or operations beyond detecting the PCI-X mode of operation. For example, in response to a system reset or POR operation, a PCI-X system will typically initiate a PCI reset sequence that includes determining the PCI clock frequency, locking the phase locked loops (PLLs) to the PCI clock frequency, and generating an initialization pattern for the plugged add-in cards.

In many designs, the PCI initialization sequence begins after the POR signal is de-asserted. However, this requires the PCI reset to extend beyond the system POR, based on a variety of stabilization lag times and other delays. Moreover, some PCI-X compliant systems employ an external voltage regulator to modulate or otherwise maintain a consistent mode signal voltage, within a variation range as defined in the standard. Thus, the amount of time the PCI reset is extended can depend, in part, on the amount of time it takes for the external voltage regulator outputs to stabilize. As external voltage regulator output stabilization times can vary between differing types of voltage regulators, estimating a consistent stabilization time can be difficult and complex. Moreover, employing an estimated stabilization time based on the slowest voltage regulators can result in an extended PCI reset that is problematically long for some applications.

Therefore, there is a need for a system and/or method for voltage indicator signal generation that addresses at least some of the problems and disadvantages associated with conventional systems and methods.

SUMMARY

The present invention provides for a system comprising a peripheral component interface (PCI) host bridge. The PCI host bridge is configured to be coupled to a PCI bus, and to receive a system reset signal, to generate a PCI bus reset signal based on the received system reset signal, to detect a PCI operational mode of the PCI bus, and to generate a voltage indicator signal based on the detected PCI operational mode. A voltage regulator is coupled to the PCI host bridge and configured to receive the voltage indicator signal and to regulate a signaling voltage for the PCI bus based on the voltage indicator signal.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
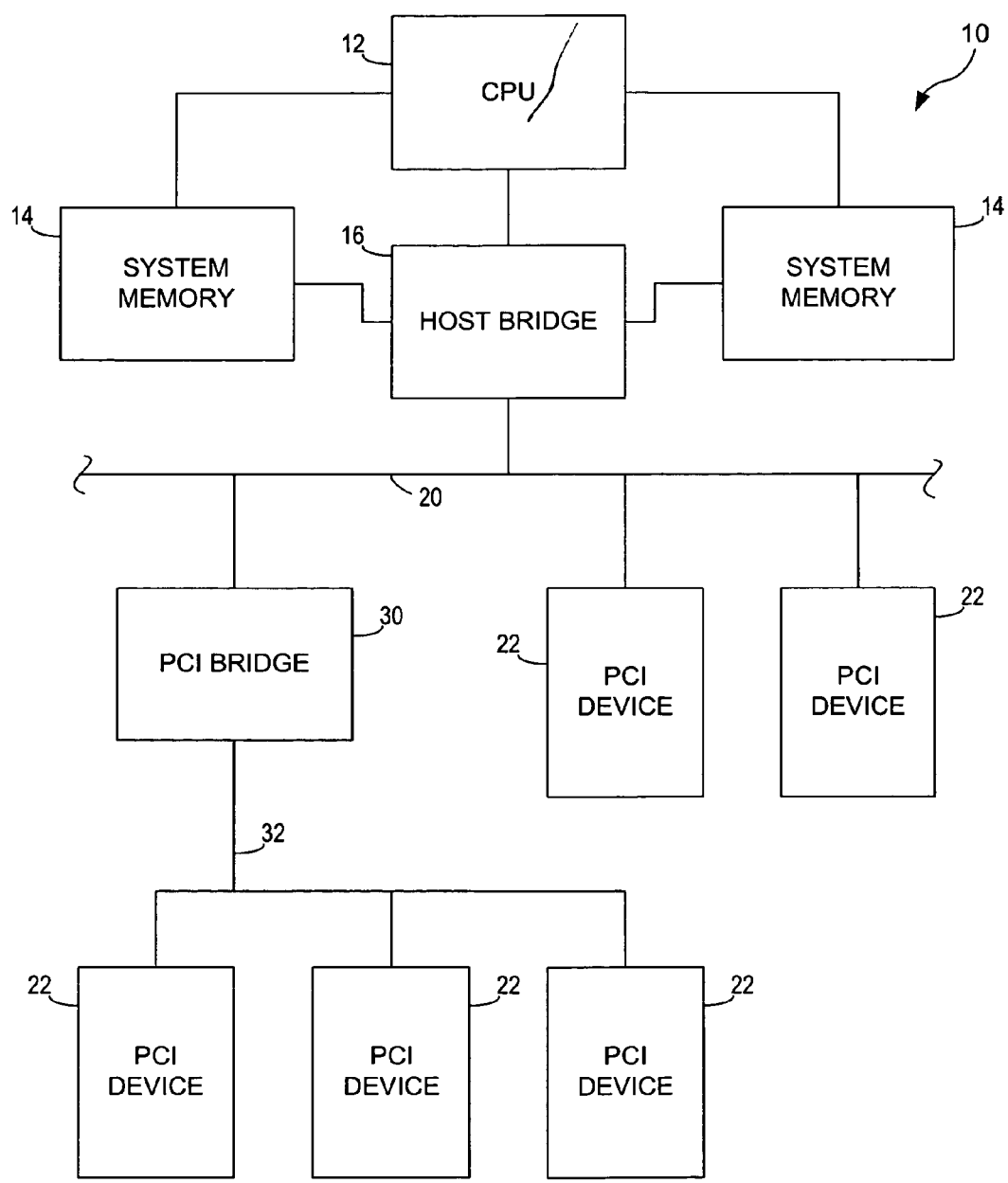
FIG. 1 is a block diagram depicting a computer system.

Referring to FIG. 1 of the drawings, the reference numeral 10 generally designates a computer system. Computer system 10 includes central processing unit (CPU) 12, system memory 14, host bridge 16, and peripheral component interface (PCI) bus 20. CPU 12 is a circuit or circuit or other suitable logic, and is configured as a processor for a computer device. CPU 12 is coupled to one or more system memories 14.

System memory 14 is a circuit or circuits or other logic suitable to be configured to store and load data in a computer system. In one embodiment, system memory 14 is a random access memory (RAM). In a particular embodiment, system memory 14 is a dynamic random access memory (DRAM). It will be understood to one skilled in the art that other suitable memory devices can also be employed, such as, for example, static RAM (SRAM), synchronous DRAM (SDRAM), or other suitable memory devices. In the illustrated embodiment, computer system 10 is depicted with two system memories 14. It will be understood to one skilled in the art that computer system 10 can include one system memory 14, more than two system memories 14, or be otherwise suitably configured.

Computer system 10 includes host bridge 16. Host bridge 16 is coupled to CPU 12 and to one or more system memories 14. Host bridge 16 is a circuit or circuits or other suitable logic and is configured as a bridge between CPU 12 and PCI bus 20, as well as PCI bus 20 and one or more of system memories 14. In one embodiment, host bridge 16 is configured as a PCI-X compliant host bridge, and can be configured as a North-Bridge. It will be understood to one skilled in the art that other configurations can also be employed. Host bridge 16 is coupled to PCI bus 20. PCI bus 20 is a circuit or circuits or other suitable logic, and is configured as a PCI-compliant bus, and is well known to those skilled in the art.

Computer system 10 also includes one or one or more PCI bridges 30, and one or more of a plurality of PCI devices 22. PCI devices 22 are PCI-compliant devices, suitable to be configured to be coupled to PCI bus 20. PCI bridge 30 is coupled to PCI bus 20. PCI bridge 30 is a circuit or circuits or other suitable logic, and is configured as a PCI-compliant host system bridge. In an alternate embodiment, PCI bridge 30 is a PCI device 22 that is configured to operate as a PCI-compliant host system bridge.

PCI bridge 30 is coupled to a PCI local bus 32. In the illustrated embodiment, one or more PCI devices 22 are coupled directly to PCI bus 20, and one or more PCI devices 22 are coupled directly to PCI local bus 32, and to PCI bus 20 through PCI bridge 30. It will be understood to one skilled in the art that other configurations can also be employed.

Generally, in operation, system memory 14 stores data, and the data stored in system memory 14 is accessed by CPU 12 and/or one or more PCI devices 22. Generally, a variety of control signals, data signals, and various other signals can be employed to coordinate and manage system functions/or access to system memory 14 by one or more components of computer system 10. In the illustrated embodiment, access to system memory 14 by those PCI devices 22 coupled directly to PCI bus 20 is managed, arbitrated, or otherwise controlled by host bridge 16. Additionally, access to PCI bus 20 by those PCI devices 22 coupled directly to PCI local bus 32 is managed, arbitrated, or otherwise controlled by PCI bridge 30.

In the illustrated embodiment, host bridge 16 is configured to provide and/or control control signals for devices coupled directly to PCI bus 20. Additionally, PCI bridge 30 is configured to provide similar signals to devices coupled to PCI local bus 32. It will be understood to one skilled in the art, that other configurations can also be employed. In one embodiment, host bridge 16 is configured to generate a system clock, a system supply voltage, and a system power-on reset (POR) signal. In one embodiment, system-wide signals can be generated, or otherwise provided to system components, by host bridge 16. In an alternate embodiment, system signals can be provided by CPU 12 and/or one or more other system devices (not shown).

Figure 2:
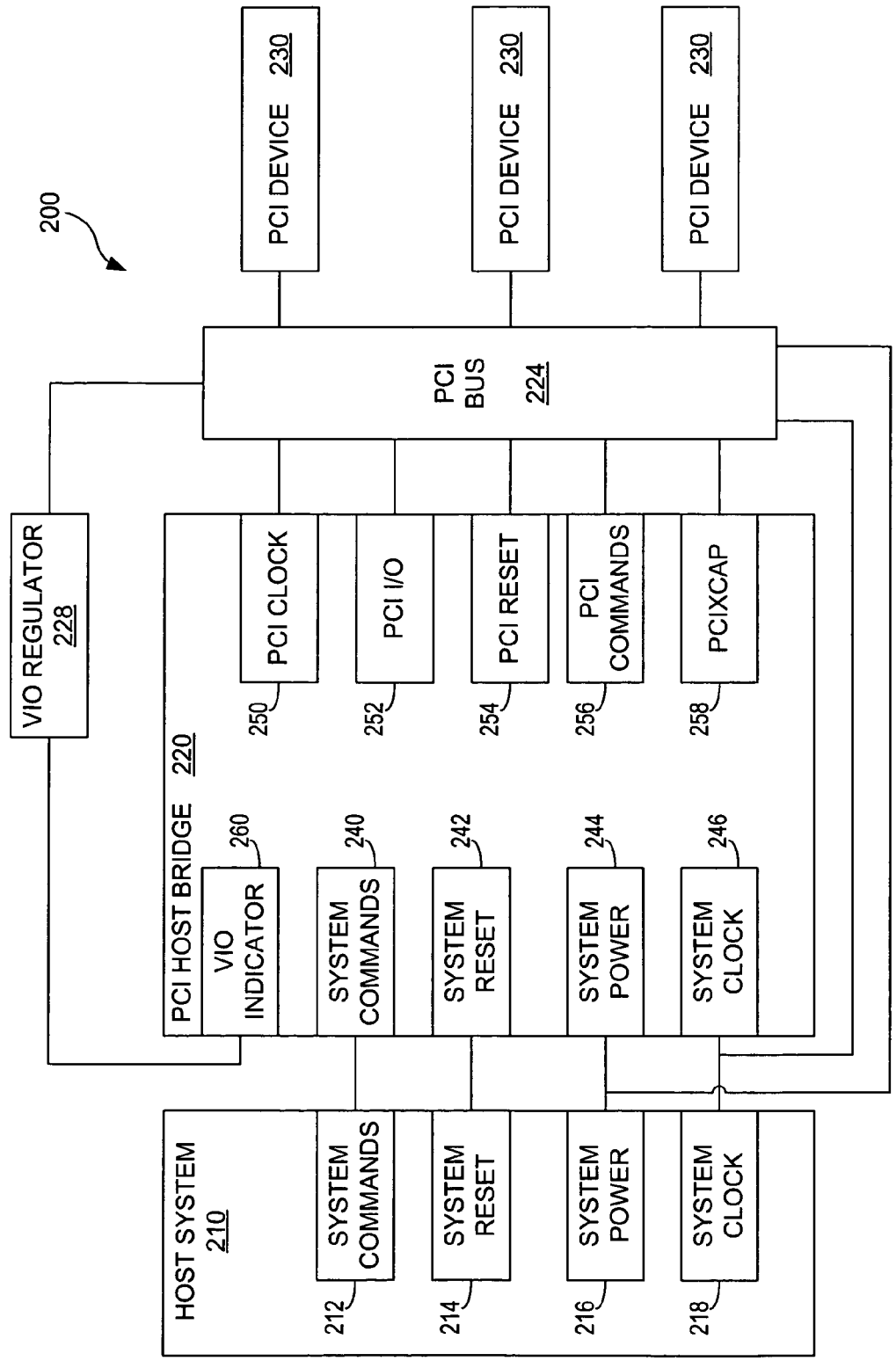
FIG. 2 is a block diagram depicting a voltage indicator signal generation system.

Referring now to FIG. 2 of the drawings, the reference numeral 200 generally designates a PCI system. PCI system 200 includes a host system 210, a PCI host bridge 220, a PCI bus 224, and one or more PCI devices 230. Host system 210 is coupled to PCI host bridge 220 and PCI bus 224. Host system 220 is a computer system, or other suitable system, configured to support a PCI-compliant subsystem. In particular, host system 220 is configured to generate, or otherwise provide, system commands, system reset signals, system power, and system clock signals.

In the illustrated embodiment, host system 210 includes system commands module 212, system reset module 214, system power module 216, and system clock module 218. System commands module 212 is a circuit or circuits or other suitable logic, and is configured to generate, or otherwise provide system commands for PCI system 200. It will be understood to one skilled in the art that system commands can be any of a variety of commands to PCI system 200. System reset module 214 is a circuit or circuits or other suitable logic, and is configured to generate a system reset signal. In a particular embodiment, a system reset signal includes a power-on reset (POR) signal. It will be understood to one skilled in the art that the system reset signal or POR signal can be configured in a variety of configurations well known to one skilled in the art.

System power module 216 is a circuit or circuits or other suitable logic, and is configured to generate, or otherwise provide, power to one or more of the various components of PCI system 200. It will be understood to one skilled in the art that system power can be configured independent of an input/output voltage employed for one or more signaling or other signals in PCI system 200. System clock module 218 is a circuit or circuits or other suitable logic, and is configured to generate, or otherwise provide, a system clock signal. As described in more detail below, the system clock signal can be employed by the PCI host bridge 220, and one or more PCI devices 230, in addition to a PCI clock signal. It will be understood to one skilled in the art that other configurations can also be employed. In the illustrated embodiment, host system 210 provides system command signals, system reset signals, system power, and system clock signals to PCI host bridge 220, and system power and system clock signals to PCI bus 224. It will be understood to one skilled in the art that other configurations can also be employed.

Additionally, details described herein with respect to one or more embodiments are generally configured to be compliant with any relevant PCI specifications and/or technical addenda. It will be understood to one skilled in the art, that numerous variations and/or modifications can be employed that are nevertheless compliant with the relevant PCI specification and/or technical addenda.

PCI host bridge 220 is coupled to host system 210 and, generally, is configured to receive various system commands from host system 210, to generate various PCI bus control, or other commands, and to generally operate as a PCI bus master. In a particular embodiment, PCI host bridge 220 includes system commands module 240, system reset module 242, system power module 244, and system clock module 246. System command module 240 is a circuit or circuits or other suitable logic, and is configured to receive system commands from host system 210. System reset module 242 is a circuit or circuits or other suitable logic, and is configured to receive system reset signals from host system 210.

System power module 244 is a circuit or circuits or other suitable logic, and is configured to receive system power from host system 210. System power module 244 can be further configured to manipulate, convert, rectify, or otherwise suitably modify system power received from host system 210 for further transmission through the PCI bus 224. It will be understood to one skilled in the art that other configurations can also be employed. System clock module 246 is a circuit or circuits or other suitable logic, and is configured to receive a system clock signal or signals from host system 210. Thus, generally, in operation, PCI host bridge 220 is configured to receive various system commands, system reset signals, system power, and system clock signals from host system 210, and to perform standard tasks and/or operations based on the signals, commands, and power received, as will be understood to one skilled in the art.

PCI host bridge 220 also includes PCI clock module 250, PCI input/output (I/O) module 252, PCI reset module 254, PCI commands module 256, and PCIXCAP module 258. PCI clock module 250 is a circuit or circuits or other suitable logic, and is configured to generate a PCI clock signal, and to transmit or otherwise provide the PCI clock signal to one or more PCI devices 230 coupled to PCI bus 224. In one embodiment, PCI clock module 250 is configured to generate a PCI clock signal based on a system clock signal received by system clock module 246. It will be understood to one skilled in the art that other configurations can also be employed. PCI I/O module 252 is a circuit or circuits or other suitable logic, and is configured to transmit and receive data and/or other information to and/or from PCI bus 224 and/or one or more PCI devices 230 coupled to PCI bus 224. It will be understood to one skilled in the art that other configurations can also be employed.

PCI reset module 254 is a circuit or circuits or other suitable logic, and is configured to generate a PCI bus reset signal, and to transmit, or otherwise provide, the PCI bus reset signal to PCI bus 224 and/or one or more PCI devices 230 coupled to PCI bus 224. In one embodiment, the PCI reset signal is a binary digital signal, in which a logic high state indicates that PCI bus 224, and devices coupled to PCI bus 224, are in a reset state, and a logic low state indicates that PCI bus 224, and devices coupled to PCI bus 224 are in an operational, functional, or otherwise normal operating state. It will be understood to one skilled in the art that other configurations can also be employed.

PCI commands module 256 is a circuit or circuits or other suitable logic, and is configured to generate PCI commands, and to transmit, or otherwise provide, PCI commands to PCI bus 224 and/or one or more PCI devices 230 coupled to PCI bus 224. Generally, PCI commands include POR or other memory initialization commands and ordinary operational commands. It will be understood to one skilled in the art that other PCI commands can also be employed, such as, for example, PCI bus arbitration or other access management commands or other suitable commands.

PCIXCAP module 258 is a circuit or circuits or other suitable logic, and is configured to identify a PCIXCAP mode, or capacity, or other configuration signal, as indicated by one or more PCI devices 230. Generally, in one embodiment, each PCI device 230 includes a PCIXCAP pin, which can be configured to identify an operational mode of the particular PCI device. For example, in one embodiment, each PCI device 230 includes a PCIXCAP pin that is configured to identify whether the PCI device 230 is configured to operate in PCI-X Mode-1 or PCI-X Mode-2. It will be understood to one skilled in the art that other configurations can also be employed.

PCI host bridge 220 includes Vio indicator module 260. Vio indicator module 260 is a circuit or circuits or other suitable logic, and is configured to generate a voltage indicator signal, and to transmit the voltage indicator signal to an external voltage regulator. In a particular embodiment, PCI host bridge 220 is coupled to Vio regulator module 228, and Vio indicator module 260 is configured to generate a voltage indicator signal and to transmit the voltage indicator signal to Vio regulator module 228. In a particular embodiment, Vio indicator module 260 is configured to generate a voltage indicator signal based on a determined PCI operational mode as detected by PCIXCAP module 258. Additionally, in a particular embodiment, Vio indicator module 260 is configured to generate a voltage indicator signal that indicates whether the Vio regulator module 228 is to provide a 3.3 V (volt) regulated voltage or 1.5 V regulated voltage for input/output signals on PCI bus 224, as described in more detail below. It will be understood to one skilled in the art that other configurations can also be employed.

In the illustrated embodiment, PCI system 200 also includes Vio regulator module 228. Vio regulator module 228 is coupled to PCI host bridge 220 and PCI bus 224, and is a circuit or circuits or other suitable logic. In a particular embodiment, Vio regulator module 228 is configured to receive a voltage indicator signal from PCI host bridge 220, and to provide, generate, or otherwise monitor and control a voltage associated with input/output signaling for devices coupled to PCI bus 224. It will be understood to one skilled in the art that other configurations can also be employed.

PCI system 200 also includes one or more PCI devices 230. PCI devices 230 are any devices suitable to be coupled to a PCI bus. It will be understood to one skilled in the art that other configurations or suitable devices can also be employed.

Generally, in operation, host system 210 indicates a system reset to PCI host bridge 220, typically through a system reset signal. As described in more detail below, PCI host bridge 220 receives the system reset signal, and places the PCI bus 224 in a reset mode of operation. In particular, PCI reset module 254 indicates to PCI bus 224 that the PCI devices coupled to PCI bus 224 are to enter into a reset mode of operation. During a PCI reset mode of operation, PCI host bridge 220 detects the capabilities of the PCI devices 230 that are coupled to PCI bus 224. In a particular embodiment, PCIXCAP module 258 samples the output of the PCIXCAP pins for each PCI device 230. Additionally, PCI host bridge 220 determines a PCI clock frequency of operation, and locks one or more phase-locked loops (PLLs), or other clock-generation components (not shown) to the determined PCI clock frequency. In a particular embodiment, PCI clock module 250 includes PLLS, which are locked into a desired PCI clock frequency, the detected PCI clock frequency of operation, during PCI bus reset.

Additionally, PCI host bridge 220 generates an initialization pattern for each PC device 230 coupled to PCI bus 224. In a particular embodiment, PCI commands module 256 is configured to generate PCI bus reset initialization commands, patterns, and/or other instructions, and to transmit or otherwise send generated commands to PCI devices 230. It will be understood to one skilled in the art that other configurations can also be employed.

Additionally, as described in more detail below, PCI host bridge 220 determines the PCI-X mode of operation, and generates a voltage indicator signal to be transmitted, or otherwise indicated to, an external voltage regulator. In a particular embodiment, PCI host bridge 220 determines a PCI-X mode of operation, and Vio indicator module 260 generates a voltage indicator signal based on the determined PCI-X mode of operation. The voltage indicator signal is transmitted or otherwise sent to Vio regulator module 228, which is configured to modulate, provide, regulate, or otherwise maintain an input/output signaling voltage for PCI bus 224. It will be understood to one skilled in the art that other configurations can also be employed.

Figure 3:
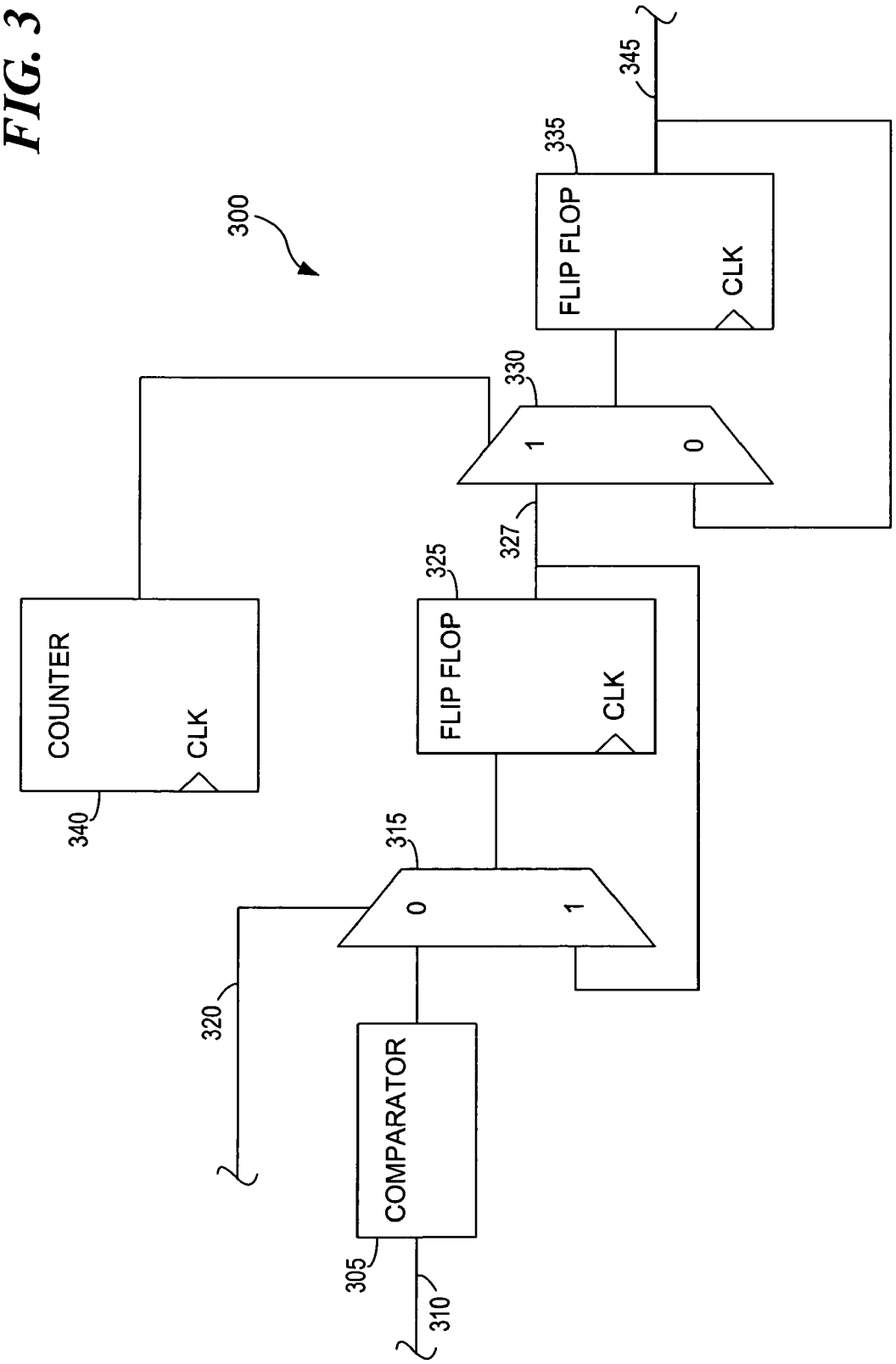
FIG. 3 is a block diagram depicting a voltage indicator signal generation system.

Referring now to FIG. 3 of the drawings, the reference numeral 300 generally designates a Vio circuit. Vio circuit 300 includes comparator 305. Comparator 305 is a circuit or circuits or other suitable logic, and is configured to compare one or more voltages of a range of voltage levels, and to generate a voltage indicator signal based on the result of the comparison. In a particular embodiment, comparator 305 is a five-level voltage comparator as defined in the PCI-X 2.0 Electrical and Mechanical Addendum, Appendix A, Section A.2 (Five Level Comparator, Mode 2). In a particular embodiment, comparator 305 is an analog comparator and is configured to sample the PCIXCAP pins of one or more PCI devices coupled to the system in which Vio circuit 300 is employed. In particular, comparator 305 is coupled to a communication link 310, which in turn, is coupled to the PCIXCAP pin or pins of one or more of the PCI devices (not shown). It will be understood to one skilled in the art that communication link 310 can be configured as a component of a PCI bus.

Comparator 305 is coupled to multiplexer 315. Multiplexer 315 is a circuit or circuits or other suitable logic, and is configured as a multiplexer. In a particular embodiment, multiplexer 315 is coupled to a PCIXCAP sampling-done indicator (not shown), through communication link 320. In particular, multiplexer 315 is configured to receive two inputs and, based on the PCIXCAP sampling-done indicator signal, to output one of the two received inputs. As described in more detail below, the two inputs to multiplexer 315 are the output of comparator 305 and the output of flip-flop 325. Generally, the PCIXCAP sampling-done indicator is configured to generate a PCIXCAP sampling-done signal indicating whether sampling of the PCIXCAP pins in the system has been completed. In a particular embodiment, the PCIXCAP sampling-done indicator signal is at a logic zero when the PCIXCAP sampling is not complete, or is otherwise in progress. Thus, when the PCIXCAP sampling-done indicator signal is at a logic zero, multiplexer 315 selects the output of comparator 305 for output. When the PCIXCAP sampling-done indicator signal is at a logic one, multiplexer 315 selects the output of flip-flop 325 for output. Thus, when the PCIXCAP sampling-done indicator signal is at a logic low, the output of comparator 305 is passed to flip-flop 325 through multiplexer 315. When the PCIXCAP pin sampling is complete, the PCIXCAP sampling-done indicator signal is at a logic high, and the output of flip-flop 325 is returned as input, through multiplexer 315.

Multiplexer 315 is coupled to flip-flop 325. Flip-flop 325 is a circuit or circuits or other suitable logic, and is configured as a flip-flop. In a particular embodiment, flip-flop 325 receives input from multiplexer 315 and a clock signal, and provides output to a multiplexer 330 through communication link 327. In a particular embodiment, flip-flop 325 is configured to receive a PCI clock signal. In an alternate embodiment, flip-flop 325 is configured to receive a system clock signal. It will be understood to one skilled in the art that other configurations can also be employed. Generally, flip-flop 325 is configured to receive an input, and to provide received input to or through communications link 327 based on received clock signals. In particular embodiment, flip-flop 325 is configured as a flip-flop and is configured to receive input in one clock cycle, and to transmit received input in a subsequent clock cycle. It will be understood to one skilled in the art, that other configurations can also be employed.

Vio circuit 300 includes multiplexer 330. Multiplexer 330 is coupled to flip-flop 325 and a counter 340. Multiplexer 330 is a circuit or circuits or other suitable logic, and is configured as a multiplexer. In a particular embodiment, multiplexer 330 is configured to receive a select signal from counter 340 and input from flip-flop 325 and flip-flop 335, through flip-flop 335 output communications link 345. Thus, in particular embodiment, where the multiplexer select signal received from counter 340 is at a logic high, or logic one, multiplexer 330 selects the output of flip-flop 325 for output to flip-flop 335. Similarly, when the multiplexer select signal is at a logic low, or logic zero, multiplexer 330 selects the output of flip-flop 335, through communication link 345, for output to flip-flop 335.

Counter 340 is a circuit or circuits or other suitable logic and is configured to count through a predetermined number of clock cycles, and to deliver a multiplexer select signal to multiplexer 330 based on a predetermined number of clock cycles. In particular embodiment, counter 340 is configured to indicate a logic high multiplexer select signal to multiplexer 330 after $2^n$ clock cycles, where "n" is a number of bits in counter 340. In a particular embodiment, "n" can be configured based on a predetermined minimum POR time. Counter 340 is also configured to receive a clock signal. In a particular embodiment, counter 340 is configured to receive a PCI clock signal. In an alternate embodiment, counter 340 is configured to receive a system clock signal. It will be understood to one skilled in the art that other configurations can also be employed.

Flip-flop 335 is coupled to multiplexer 330 and is a circuit or circuits or other suitable logic, and is configured as a flip-flop. Flip-flop 335 is configured to receive input from multiplexer 330 and a clock signal. In one embodiment, flip-flop 335 is configured to receive a PCI clock signal. In an alternate embodiment, flip-flop 335 is configured to receive a system clock signal. It will be understood to one skilled in the art, that other configurations can also be employed. Generally, flip-flop 335 is configured to receive an input, and to provide received input to or through communications link 345 based on received clock signals. In particular embodiment, flip-flop 335 is configured as a flip-flop and is configured to receive input in one clock cycle, and to transmit received input in a subsequent clock cycle. It will be understood to one skilled in the art, that other configurations can also be employed.

Generally, in operation, Vio circuit 300 is configured to receive input from the PCIXCAP pins of PCI devices coupled to the system, and to output a PCI-X mode indicator. Thus generally, it will be understood to one skilled in the art that PCI Vio circuit 300 is configured to incorporate an appropriate settling time for one or more components of the system in which Vio circuit 300 is employed.

Therefore, generally, the multiplexer select signal 320 is asserted, or otherwise at a logic high state, after the de-assertion of a system POR signal, and generally indicates that the various settling time components and associated signals have stabilized. As used herein, "stabilized" means not varying by a significant amount over time. Thus, prior to de-assertion of the system reset signal, multiplexer 315 receives the output from comparator 305, the voltage indicator signal, and outputs the PCI-X mode indicator signal to flip-flop 325. It will be understood to one skilled in the art that during the system reset, the PCIXCAP PCI-X mode indicator signals, and therefore the voltage indicator signal, will typically fluctuate before stabilizing, which typically occurs before assertion of the PCIXCAP sampling-done indicator signal.

Thus, during a POR reset, multiplexer 315 passes the voltage indicator signal, which will eventually stabilize, to flip-flop 325. When the PCIXCAP sampling-done indicator signal is asserted, the output of flip-flop 325, the now-stable voltage indicator signal, will be looped back into flip-flop 325 through multiplexer 315. As described above, counter 340 is configured to generate a multiplexer select pulse or signal at a logic high to multiplexer 330, which in turn selects the output of flip-flop 325 as the input to flip-flop 335. As described above, counter 340 can be configured to count through a predetermined number of clock cycles before generating the logic high multiplexer select signal, based on an anticipated settling time for one or more components of the system in which Vio circuit 300 is employed, or a total PCI bus reset time.

In a particular embodiment, the number of clock cycles through which counter 340 counts can be configured based on a tolerance of a voltage regulator and a frequency of the PCI system clock. In a particular embodiment, the number of clock cycles can be based on a known predetermined minimum time after a system reset at which the reference, or system, clock and/or system power are expected stable, that is, a minimum time during which the external voltage regulator allows a voltage level to be stabilized before the voltage indicator signal enters the correct state. Therefore, oscillation or otherwise frequent changes in the voltage indicator can be reduced.

Furthermore, the total time of POR for Vio circuit 300 can be configured based on the minimum time after power-on after which the system clock and system power are stable, the minimum time after the voltage indicator signal is stable after which the voltage levels are stabilized by the external voltage regulator, and the digital filter delay introduced through counter 340. Thus, the proper voltage level for the PCI signals can be achieved before the system reset signal is deasserted.

Accordingly, flip-flop 335 can be configured to maintain a somewhat consistent output through communication link 345, as multiplexer 330 is configured to return as input the output of a flip-flop 335 while the multiplexer select signal is at a logic low state. Accordingly, Vio circuit 300 can be configured to avoid or otherwise minimize frequent changes of the voltage indicator signal during a power up, when the system and/or PCI clocks and other voltages and/or signals are not yet stable.

Figure 4:
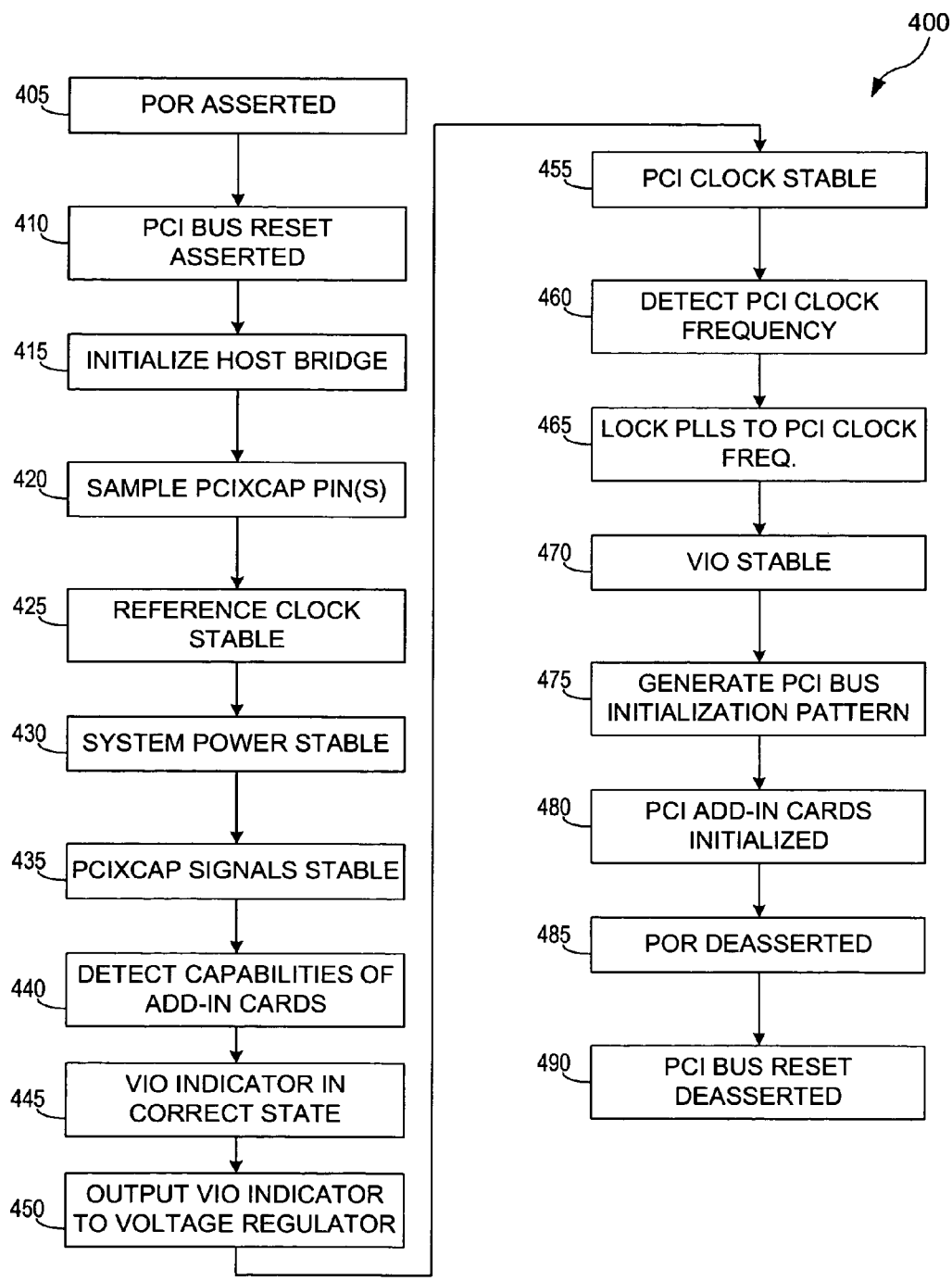
FIG. 4 is a flow diagram depicting a voltage indicator signal generation method.

Referring now to FIG. 4 of the drawings, the reference numeral 400 generally designates a flow diagram depicting a method for generating a voltage indicator signal. For ease of illustration, the method described with respect to FIG. 4 will be described with respect to a PCI system such as, for example, PCI system 200 of FIG. 2. It will be understood to one skilled in the art the method can also be employed in other systems.

The process begins at step 405, wherein a power-on reset (POR) signal is asserted. This step can be performed by system reset module 214 of host system 210 of FIG. 2. At next step 410, a PCI bus reset signal is asserted. This step can be performed by PCI reset module 254 of PCI host bridge 220 of FIG. 2. At next step 415, a host bridge is initialized. This step can be performed by host system 210 initializing PCI host bridge 220 FIG. 2. It will be understood to one skilled in the art that step 415 can include various system reset or other commands.

At next step 420, PCIXCAP pins are sampled. This step can be performed by PCIXCAP module 258, sampling the PCIXCAP pins of one or more PCI devices 230 coupled to PCI bus 224 of FIG. 2. At next step 425, a reference clock is stabilized. This step can be performed by PCI host bridge 220 of FIG. 2, in particular, system clock module 246. This step can include identifying or otherwise determining that a system clock signal of host system 210 has stabilized. At next step 430, a system power is stabilized. This step can be performed by PCI host bridge 220 of FIG. 2, in particular, system power module 244. This step can include identifying that a system power, as provided by system power module 216, has stabilized.

At next step 435, the PCIXCAP signals are stable. This step can be performed by PCI host bridge 220 and can include identifying or otherwise determining that the PCI-X mode select signals of PCI devices 230 coupled to PCI bus 224 have stabilized. At next step 440, the capabilities of add-in cards are detected. This step can be performed by PCI host bridge 220 of FIG. 2, and can include identifying a PCI-X mode of operation, based on the PCIXCAP signals stabilized in step 435. At next step 445, the voltage indicator signal is in a correct state. This step can be performed by Vio indicator module 260 of PCI host bridge 220 of FIG. 2.

At next step 450, a Vio indicator signal is output, or otherwise sent to a voltage regulator. This step can be performed by Vio indicator module 260 sending a voltage indicator signal to Vio regulator module 228 of FIG. 2. At next step 455, a PCI clock signal is stabilized. This step can be performed by PCI clock module 250 of FIG. 2. At next step 460, a PCI clock frequency is detected. This step can be performed by PCI clock module 250, and can be based on the PCI clock signal of step 455. It will be understood to one skilled in the art that stabilization of a PCI clock signal and detecting the PCI clock frequency can be based on stabilization of a reference or system clock, as in step 425. At next step 465, the PLLs are locked to the PCI clock frequency detected in step 460. This step can be performed by PCI clock module 250 of FIG. 2.

At next step 470, a Vio is stabilized. This step can be performed by Vio regulator 228 of FIG. 2. At next step 475, a PCI bus initialization pattern is generated. This step can be performed PCI host bridge 220. In a particular embodiment, this step is performed by PCI command module 256 of FIG. 2. It will be understood to one skilled in the art that step 475 can include driving one or more initialization patterns to PCI bus 224, and thereby to one or more PCI devices 230 coupled to PCI bus 224.

At next step 480, the PCI add-in cards are initialized. In a particular embodiment, this step can include completion of one or more initialization sequences of the PCI devices 230 coupled to PCI bus 224 of FIG. 2. At next step 485, the POR or system reset signal is de-asserted. This step can be performed by host system 210 of FIG. 2. At next step 490, the PCI bus reset signal is de-asserted, and the process ends. This step can be performed by PCI reset module 254 of PCI host bridge 220 of FIG. 2.

While the above steps have been described in a particular order, it will be understood to one skilled in the art that other steps can be included or particular steps omitted without departing from the spirit or scope of the present invention. Additionally, the steps can be performed in an order different than that described above. For example, it will be understood to one skilled in the art that stabilization of the Vio provided voltage (step 470) may occur before the PLLs are locked to the PCI clock frequency (step 465). It will be understood to one skilled in the art that other timing considerations can also be incorporated into the process.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   receiving an asserted system reset signal;
   generating a peripheral component interconnect (PCI) bus reset signal based on the received system reset signal;
   determining a PCI operational mode of a PCI bus; and
   stabilizing a voltage indicator signal based on the determined PCI operational mode prior to a deassertion of the system reset signal.

2. The method as recited in claim 1, wherein determining a PCI operational mode of a PCI bus comprises:
   sampling a PCIXCAP signal.

3. The method as recited in claim 1, further comprising:
   generating a PCI clock signal; and
   generating initialization commands for devices coupled to the PCI bus.

4. The method as recited in claim 1, wherein the system reset signal is a power-on reset (POR) signal.

5. A computer program product, the computer program product having a medium with a computer program embodied thereon, the computer program comprising:
   computer code for receiving a system reset signal;
   computer code for generating a peripheral component interconnect (PCI) bus reset signal based on the received system reset signal;
   computer code for determining a PCI operational mode of a PCI bus; and
   computer code for stabilizing a voltage indicator signal based on the determined PCI operational mode prior to a deassertion of the system reset signal.

6. The computer program product as recited in claim 5, wherein computer code for determining a PCI operational mode of a PCI bus comprises:
   computer code for sampling a PCIXCAP signal.

7. The computer program product as recited in claim 5, further comprising:
   computer code for generating a PCI clock signal; and
   computer code for generating initialization commands for devices coupled to the PCI bus.

8. The computer program product as recited in claim 5, wherein the system reset signal is a power-on reset (POR) signal.

9. The method as recited in claim 1, wherein the system reset signal is deasserted based on a predetermined power-on reset (POR) settling time, and wherein the predetermined POR settling time comprises a system reference clock stabilization time and a system reference voltage stabilization time.

10. The computer program product as recited in claim 5, wherein the system reset signal is deasserted based on a predetermined power-on reset (POR) settling time, and wherein the predetermined POR settling time comprises a system reference clock stabilization time and a system reference voltage stabilization time.

* * * * *